United States Patent [19]

Higuchi et al.

[11] Patent Number: 5,046,181
[45] Date of Patent: Sep. 3, 1991

[54] SWITCHING SYSTEM WITH TWO-WAY LINE MANAGING SYSTEM

[75] Inventors: Mamoru Higuchi, Yamato; Yoshihiro Kaneko, Machida, both of Japan

[73] Assignee: Fujitsu Limited, Kawasaki, Japan

[21] Appl. No.: 495,438

[22] Filed: Mar. 19, 1990

[30] Foreign Application Priority Data

Mar. 17, 1989 [JP] Japan .................... 01-063869

[51] Int. Cl.⁵ .......................... H04Q 11/04
[52] U.S. Cl. .................... 370/58.1; 379/241; 379/229
[58] Field of Search ........... 370/58.1, 59; 379/229, 379/241

[56] References Cited

U.S. PATENT DOCUMENTS

| | | | |
|---|---|---|---|
| 3,491,213 | 2/1970 | Gilboy et al. | 379/241 |
| 3,778,555 | 12/1973 | Nordling et al. | 379/229 |
| 4,603,415 | 7/1986 | Nakada et al. | 370/59 |

FOREIGN PATENT DOCUMENTS

| | | | |
|---|---|---|---|
| 52-133711 | 11/1977 | Japan | 379/241 |
| 56-117466 | 9/1981 | Japan | 379/241 |
| 0126848 | 5/1989 | Japan | 370/58.1 |
| 0194646 | 8/1989 | Japan | 370/58.1 |

Primary Examiner—Douglas W. Olms
Assistant Examiner—Dang Ton
Attorney, Agent, or Firm—Staas & Halsey

[57] ABSTRACT

A switching system having two-way lines connected between a primary office and an opposite office for communicating through a selected one of the two-way lines, and having a control unit for selecting one of the two-way lkines to be used for communication. To reduce double hunting of a two-way line, the control means comprises an outgoing connection process controlling unit for detecting a release of a two-way line activated by the primary office, an incoming connection process controlling unit for detecting a release of a two-way line activated by the opposite office, and a two-way line managing unit for deciding the priorities for selection of a plurality of two-way lines. The two-way line managing unit provides a different priority for selection to a released two-way line depending on whether the released two-way line had been activated by the primary office or by the opposite office.

30 Claims, 20 Drawing Sheets

CONVENTIONAL MULTIPROCESSOR ARRANGEMENT

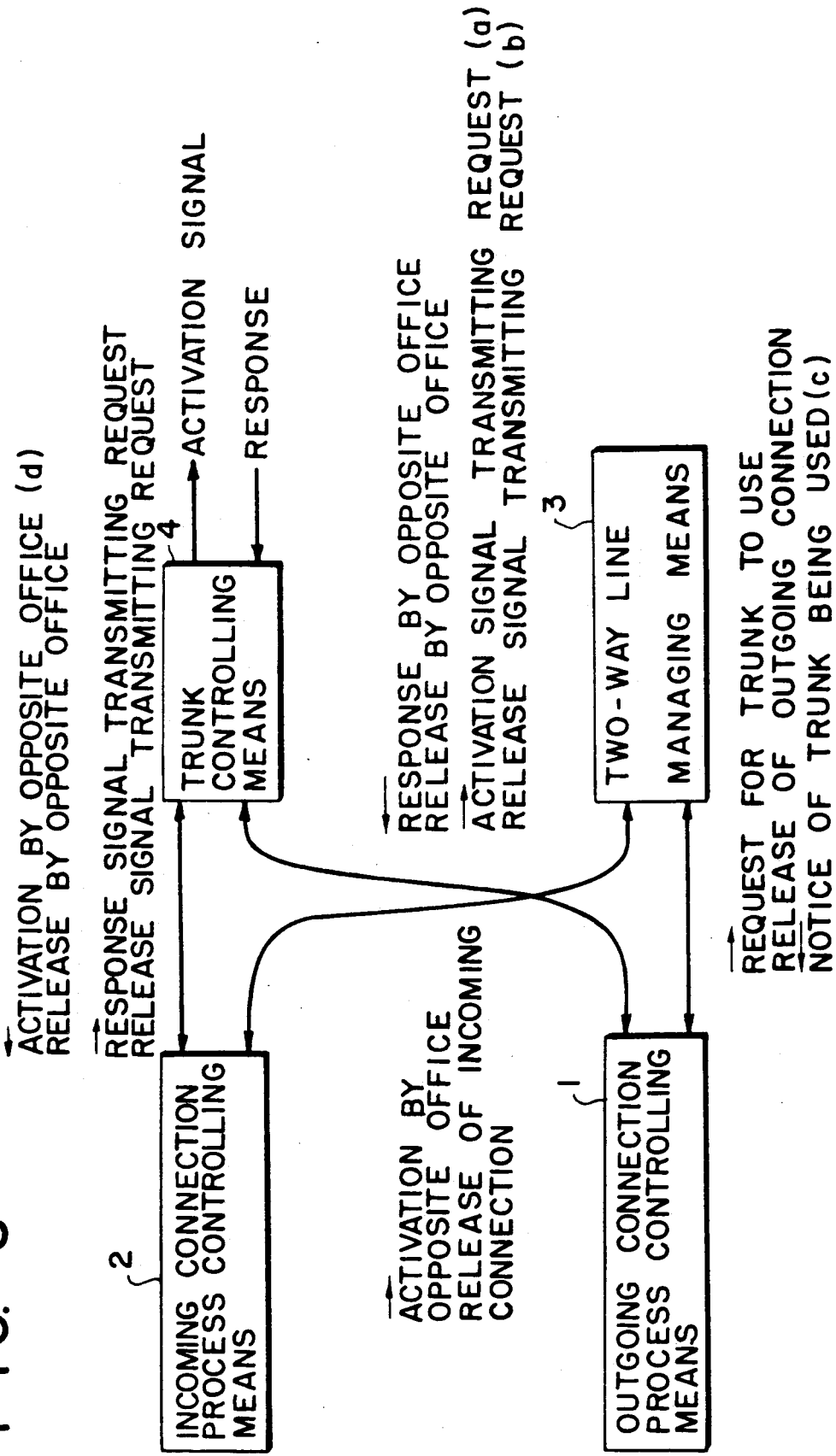

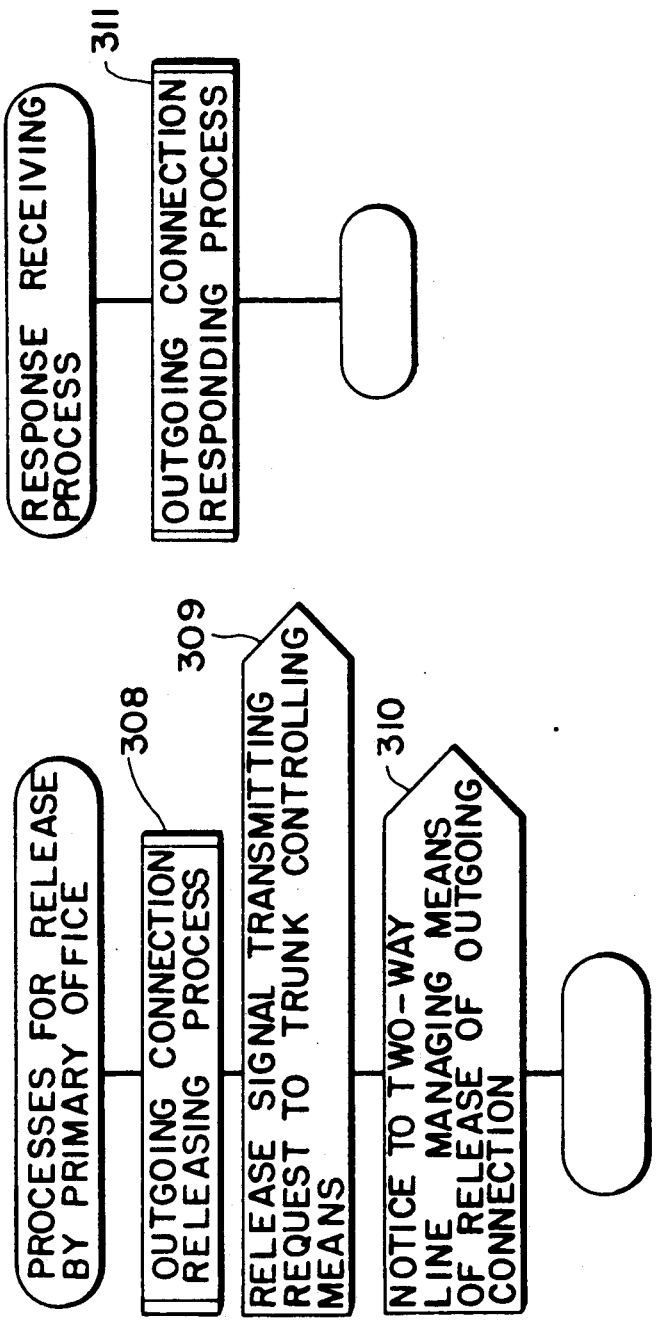

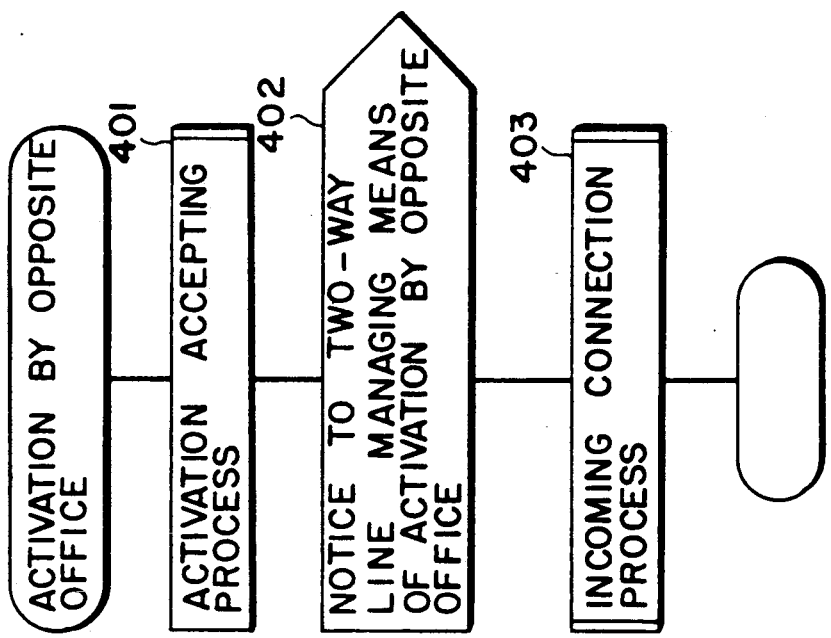
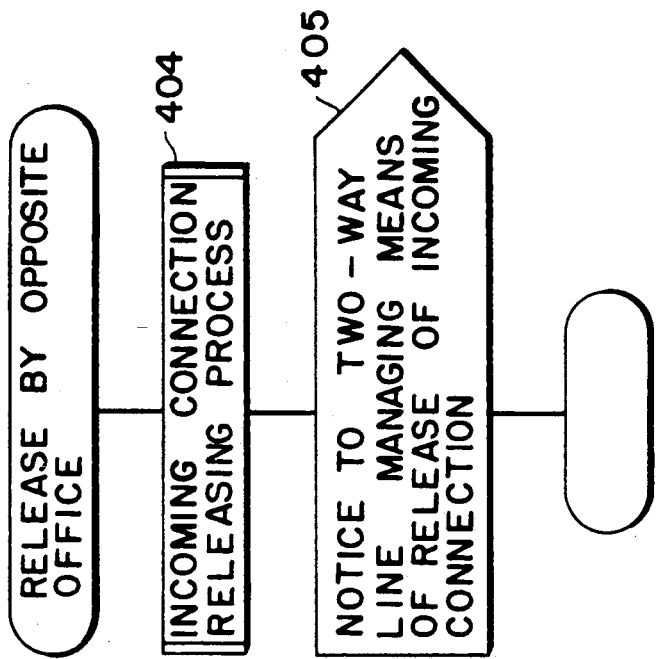
FIG. 8B
FIG. 8A

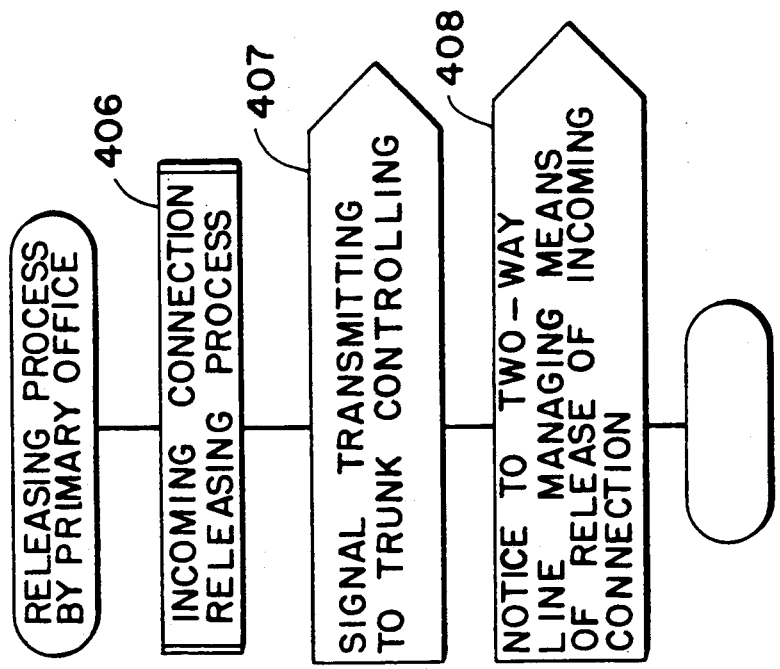

--- BEFORE PROCESS
→ AFTER PROCESS
⊖ TARGET TRUNK OF RELEASING PROCESS

FIG. 14B
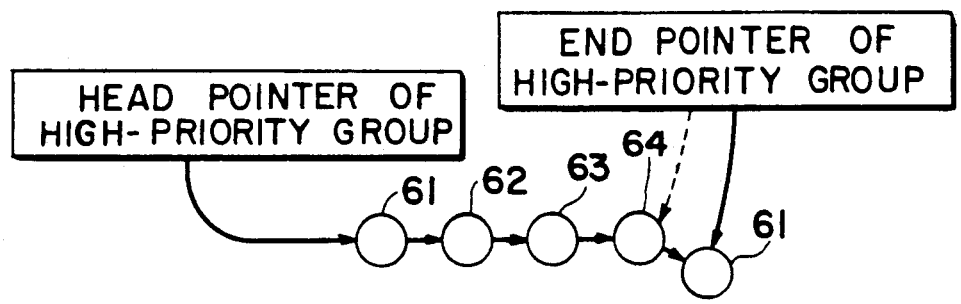
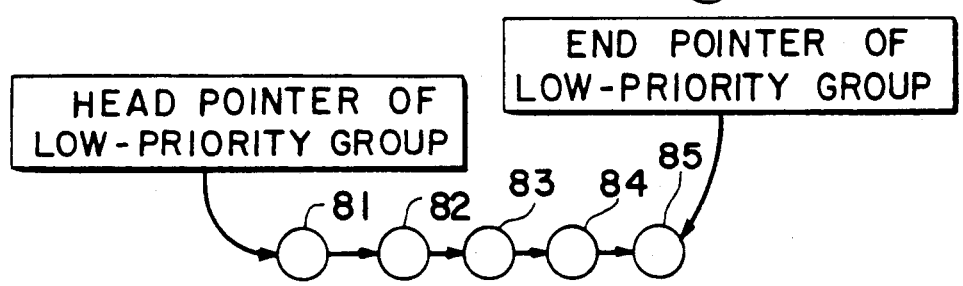
FIG. 14D
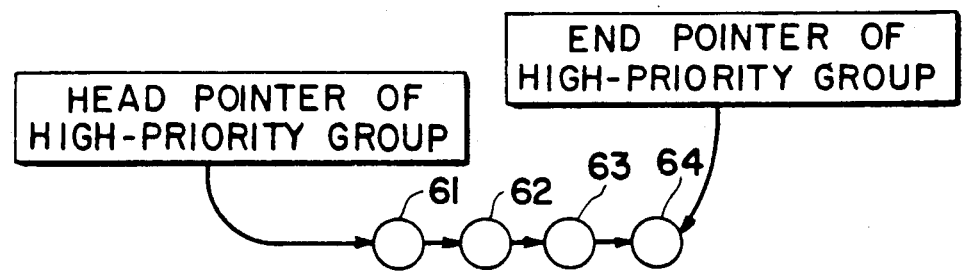
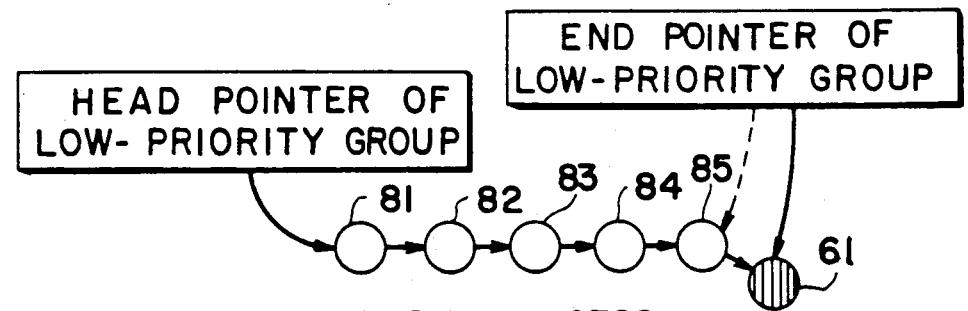
◄--- BEFORE PROCESS
◄— AFTER PROCESS
🍥 TARGET TRUNK OF RELEASING PROCESS

SWITCHING SYSTEM WITH TWO-WAY LINE MANAGING SYSTEM

BACKGROUND OF THE INVENTION (1) Field of the Invention

The present invention relates to a switching system having a selecting function of two-way lines, and particularly to a switching system that can reduce, irrespective of the structure of an opposite office, the possibility of simultaneous hunting of a single line by two offices.

Each two-way line can be hunted by a primary office or by an opposite office.

In actual use, the two offices may simultaneously try to use the same two-way line. If this double hunting occurs, one of the offices must retry to hunt other line. This retrying causes such disadvantages as an increase in the number of processes a controller must carry out, and a delay in the processes. A managing system for reducing the double hunting is therefore needed.

(2) Description of the Related Art

An example of a prior art is disclosed in Japanese Patent Publication (Kokai) No. 52-133711 published on Nov. 9, 1977, entitled "Both-way Circuit Operating System". In this reference, two-way lines are connected between two exchange switches, and controllers for these exchange switches assign hunting priorities to the two-way lines such that the priorities for one office are reverse to those for the other office, thereby reducing the probability of occurrence of double hunting.

Another example of a prior art is disclosed in Japanese Patent Publication (Kokai) No. 56-117466, published on Sept. 14, 1981. In this reference, the two-way line managing system classifies two-way lines into a high-priority group and a low-priority group. The two-way lines of the high-priority group in one office are put in the low-priority group in the other office, and the two-way lines of the low-priority group in the one office are put in the high-priority group in the other office. This sort of grouping of the two-way lines may be done according to even and odd numbers thereof.

According to a second conventional system, a two-way line which has been free for a longest time period is selected from the high-priority group. If no free circuit is found in the high-priority group, a circuit which has been freed most recently is selected from the low-priority group. The second prior art system can also reverse the selection priorities of the circuits in both the offices, thereby reducing the probability of an occurrence of double hunting.

The first prior art system explained above has the following problems:

(1) The priorities of circuits for one office are predetermined according to the conditions of the other office. Namely, the one office cannot determine the priorities according to its own conditions. In this way, determining the priorities entails many restrictions.

(2) If there is an inconsistency between both the offices in assigning the priorities, the probability of an occurrence of double hunting may increase.

(3) Both the offices must adopt the same managing system.

(4) The first conventional system is difficult to effectively realize when the two-way lines are controlled by a multiprocessor system as will be later described in more detail with reference to the drawings.

The second prior art system has the following problems:

(1) Similar to the first conventional system, one office must employ the same managing system as that employed by the other office. If the offices employ the first and second conventional systems, respectively, the probability of an occurrence of the double hunting may not be decreased.

(2) If the other office is allowed to employ only the first conventional system, the one office cannot adopt the second conventional system.

The most serious problems are that selection of the first and second conventional systems is determined by a switching machine, and that some switching machines are allowed to employ only one of the systems. If one switching machine is allowed to employ only the first conventional system and the other switching machine only the second system, these switching machines cannot be connected to each other.

SUMMARY OF THE INVENTION

An object of the present invention is to provide a two-way line managing system which can reduce the probability of double hunting, irrespective of a managing system adopted by an opposite office.

Another object of the present invention is to provide the above system in which it is not necessary to reversely set the priorities of two-way lines in two offices. The priorities are automatically determined according to the states of usage of the circuits, so that problems in system design may be eliminated.

Still another object of the present invention is to provide the above system in which even if the priorities of two-way lines are not reversely set in both offices at the beginning, the priorities will automatically be adjusted through the repetition of hunte of the circuits by both the offices, thereby gradually reducing the probability of double hunting.

To attain the above objects, there is provided, according to the present invention, a two-way line managing system having a plurality of two-way lines connected between a primary office and an opposite for communicating through a selected one of the plurality of two-way lines, and having a control unit for selecting one of the plurality of two-way lines to be used for communication. The control means comprises an outgoing connection process controlling unit for detecting a release of a two-way line activated by said primary office; an incoming connection process controlling unit for detecting a release of a two-way line activated by the opposite office; and a two-way line managing unit for deciding the priorities for selection of a plurality of two-way lines.

The two-way line managing unit provides a different priority for selection to a released two-way line depending on whether the released two-way line had been activated by the primary office or by the opposite office.

BRIEF DESCRIPTION OF THE DRAWINGS

The above objects and features of the present invention will be more apparent from the following description of the preferred embodiments with reference to the drawings, wherein;

FIG. 6 is a block diagram, for explaining the function of each means in the system shown in FIG. 5;

FIGS. 7A to 7D are flowcharts for explaining the operations of outgoing connection process controlling means shown in FIG. 6;

FIGS. 8A to 8D show flowcharts for explaining the operations of incoming connection process controlling means shown in FIG. 6;

FIGS. 14A to 14D explain a trunk releasing process according to the second embodiment of the invention.

DESCRIPTION OF THE PREFERRED EMBODIMENTS

For better understanding of the present invention, the background of the present invention will be described with reference to FIGS. 1 and 2.

Figure 1:
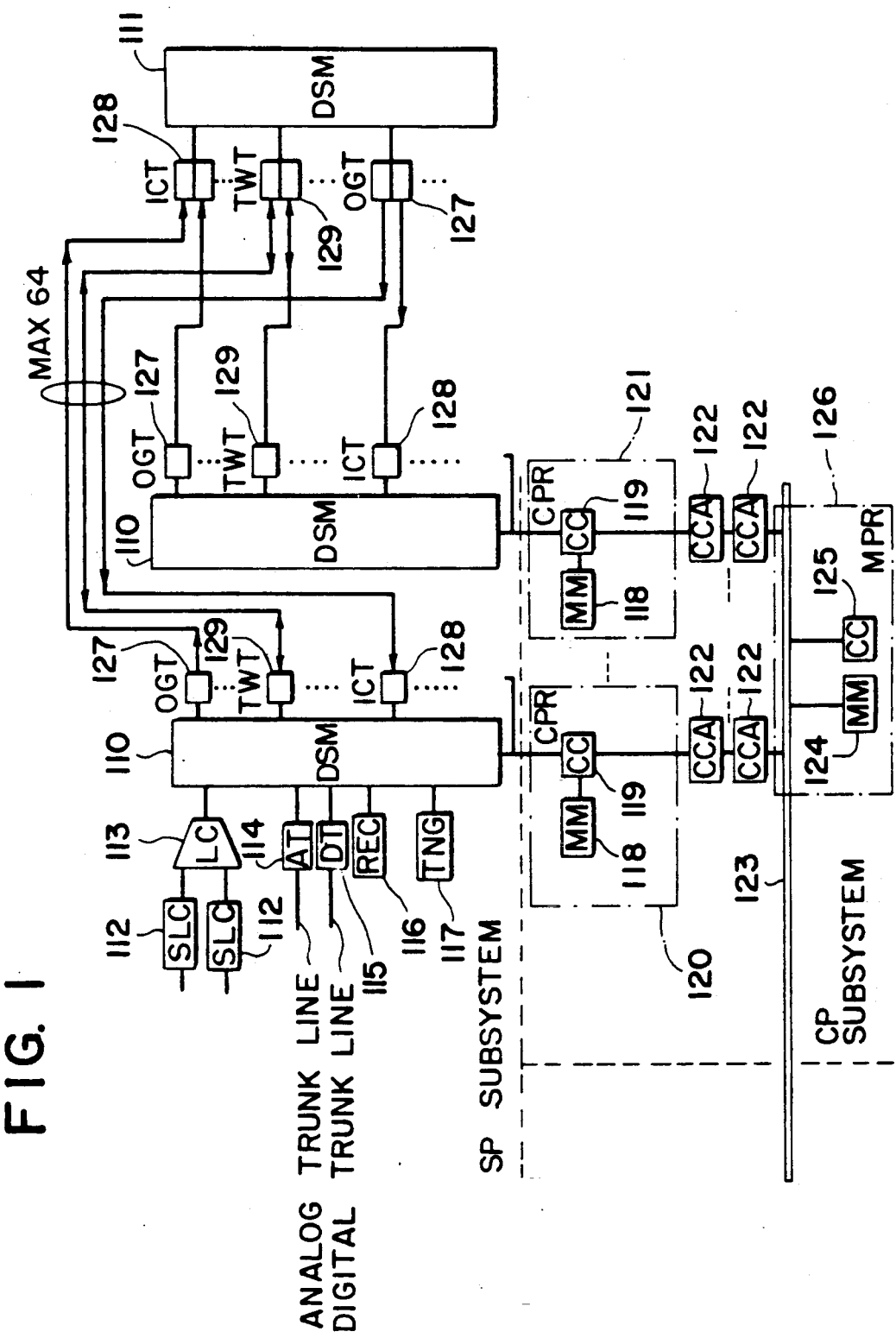
FIG. 1 is a block diagram showing an example of conventional distributed switching machines as a background of the invention.

FIG. 1 is a block diagram showing an example of distributed switching machines as a background of the present invention. In the figure, a maximum of 64 circuits are connected between two time-division switching networks (DSMs) 110 and 111. The circuits include unidirectional circuits employing a group of outgoing trunks (OGTs) 127 and a group of incoming trunks (ICTs) 128, and two-way lines employing a group of two way trunks (TWTs) 129. Each time-division switching network (DSM) 110 is connected to subscriber circuits (SLCs) 112 via a subscriber line concentrator (LC) 113, to an analog trunk circuit via an analog trunk (AT) 114, and to a digital trunk circuit via digital terminal (DT) 115. In the figure, (REC) 116 denotes a signal receiver, and (TNG) 117 a signal tone generator.

The time-division switching networks (DSMs) 110 are controlled by call processors (CPRs) 120 and 121, respectively, each having a main memory (MM) 118, a central controller (CC) 119, etc. The call processors (CPRs) 120 and 121 are connected to a common bus 123 via channel-to-channel connectors (CCA) 122. The common bus 123 is connected to a main processor (MPR) 126 having a main memory (MM) 124 and a central controller (CC) 125.

The opposite side time-division switching network (DSM) 111 is also connected to units (not shown in the figure) similar to the units 113 to 117 and 120.

Bidirectional circuits 130 are connected between the two way trunks 129 of two opposite offices.

The present invention relates to an improvement in the central controller (CC) 119 for determining the priority of selection of one line in the plurality of two-way lines connected to the group of two way trunks (BWTs) 129.

Figure 2:
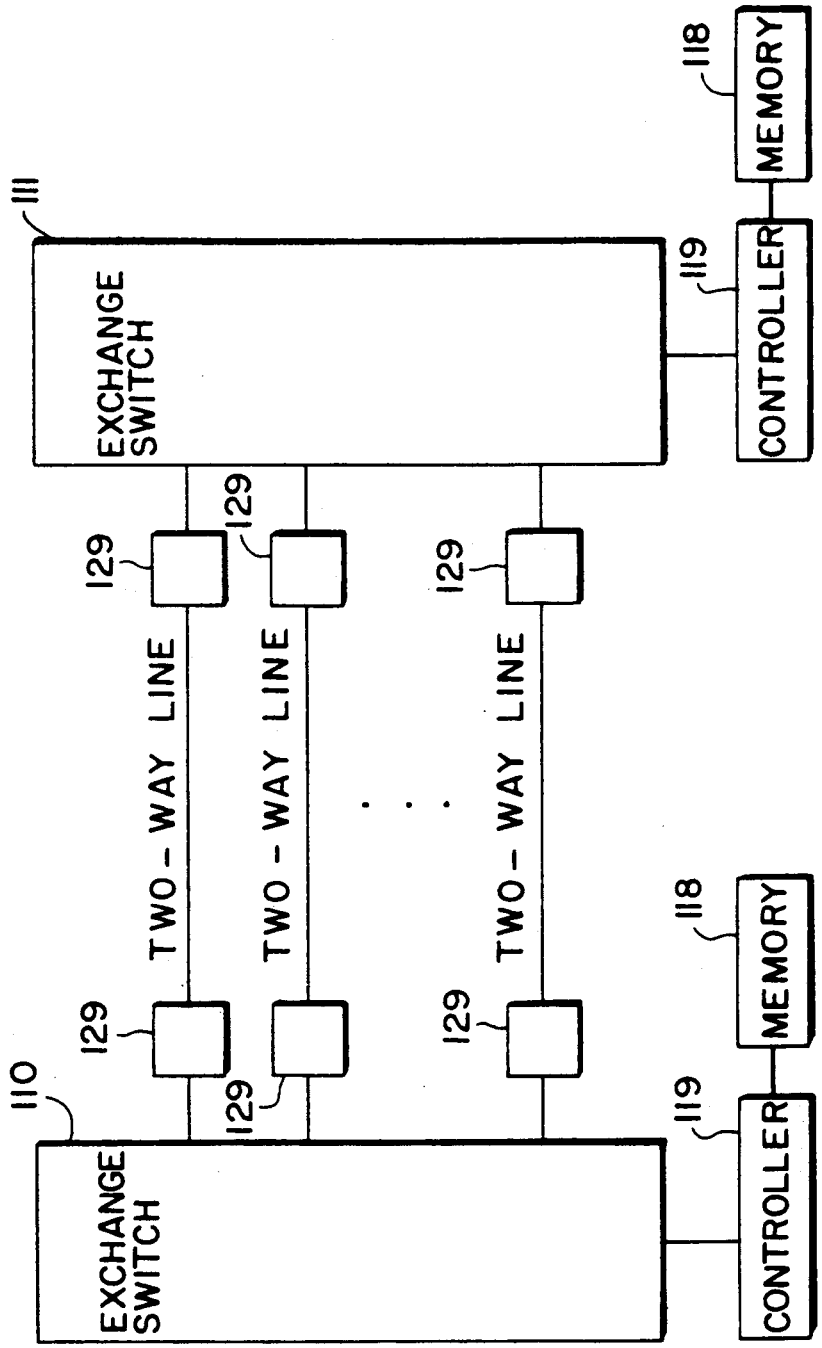
FIG. 2 is a block diagram showing a part of FIG. 1 related to the present invention.

FIG. 2 is a block diagram showing part of the distributed switching machines of FIG. 1 related to the present invention. Corresponding parts in FIG. 1 are represented with the same numerals in FIG. 2. In the figure, the two-way lines are connected between the exchange switches 110 and 111 through the two-way trunks 129.

Each two-way line can be hunted by an office A or by an office B.

In actual use, it may happen that the offices A and B simultaneously try to hunt the same two-way line. If this double hunting occurs, one of the offices must re-hunt a circuit. This rehunting causes such disadvantages as an increase in the number of processes the controller 119 must carry out, and a delay in the processes. A managing system for reducing double hunting is therefore needed.

Before describing the preferred embodiments of the present invention, prior arts will be described with reference to FIGS. 3 and 4.

Figure 3:
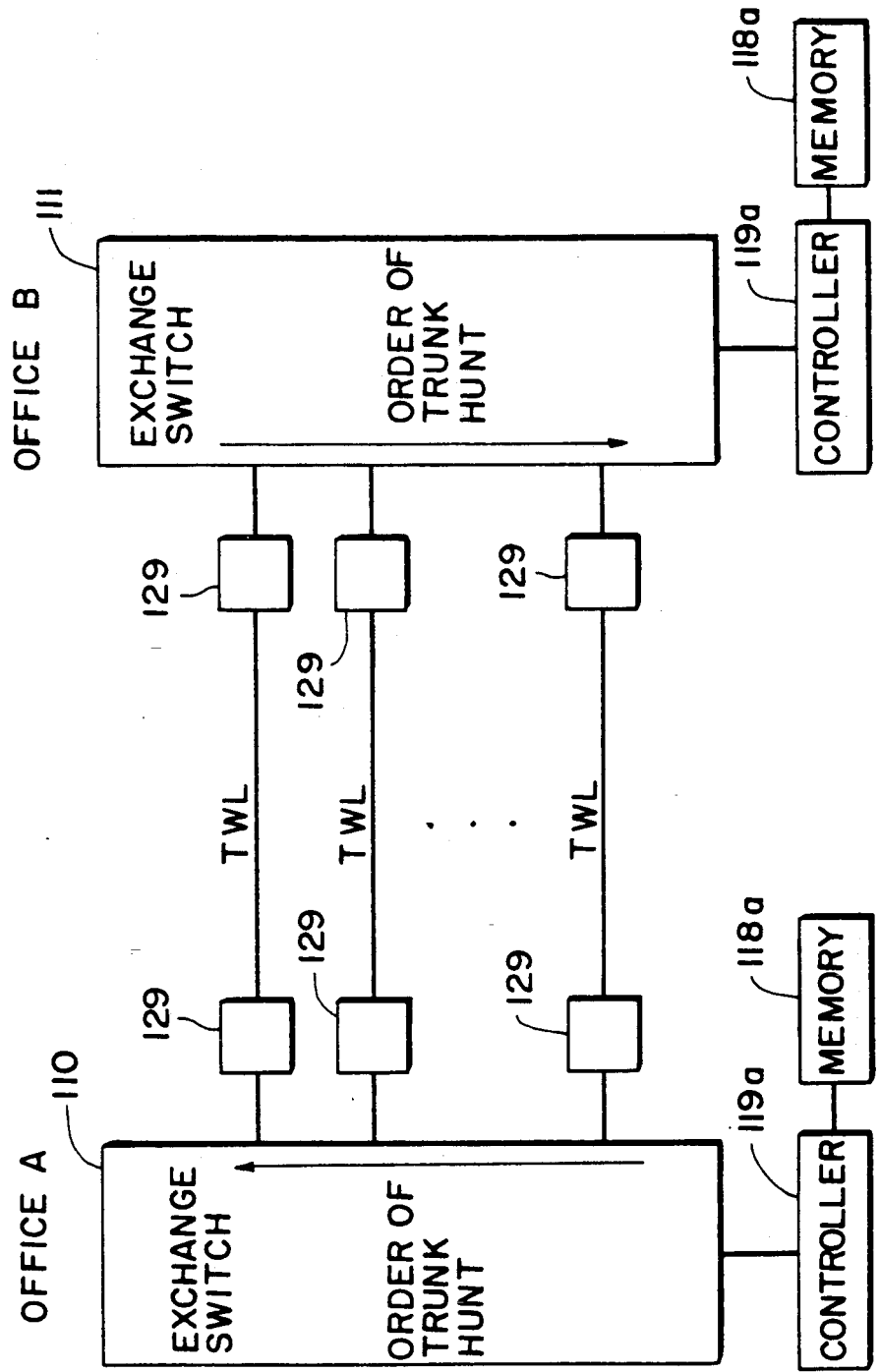
FIG. 3 is a block diagram showing an example of conventional two-way line managing systems.

FIG. 3 is a block diagram showing a first example of prior-art two-way line managing systems disclosed in Japanese Patent Publication (Kokai) No. 52-133711. In this example, two-way lines are connected to exchange switches 110 and 111. Controllers 119a of offices A and B assign hunting priorities to the two-way lines such that the priorities for one office are reverse to those for the other office, thereby reducing the probability of occurrence of double hunting. Namely, the priorities of the two-way lines for the exchange switch 110 descend from the bottom to the top of the figure, while those for the exchange switch 111 descend from the top to the bottom of the figure. This lowers the probability of simultaneous hunting of the same two-way line by both offices.

The above mentioned first example of the prior art, however, has many problems as described before in the description of the related arts.

The second example of the prior art and its problems was also already described in the description of the related arts.

The problem (4) in the first example of the prior arts was that the system is difficult to effectively realize when the two-way lines are controlled by a multiprocessor system. The problem (4) will be explained in detail with reference to FIG. 4.

Figure 4:
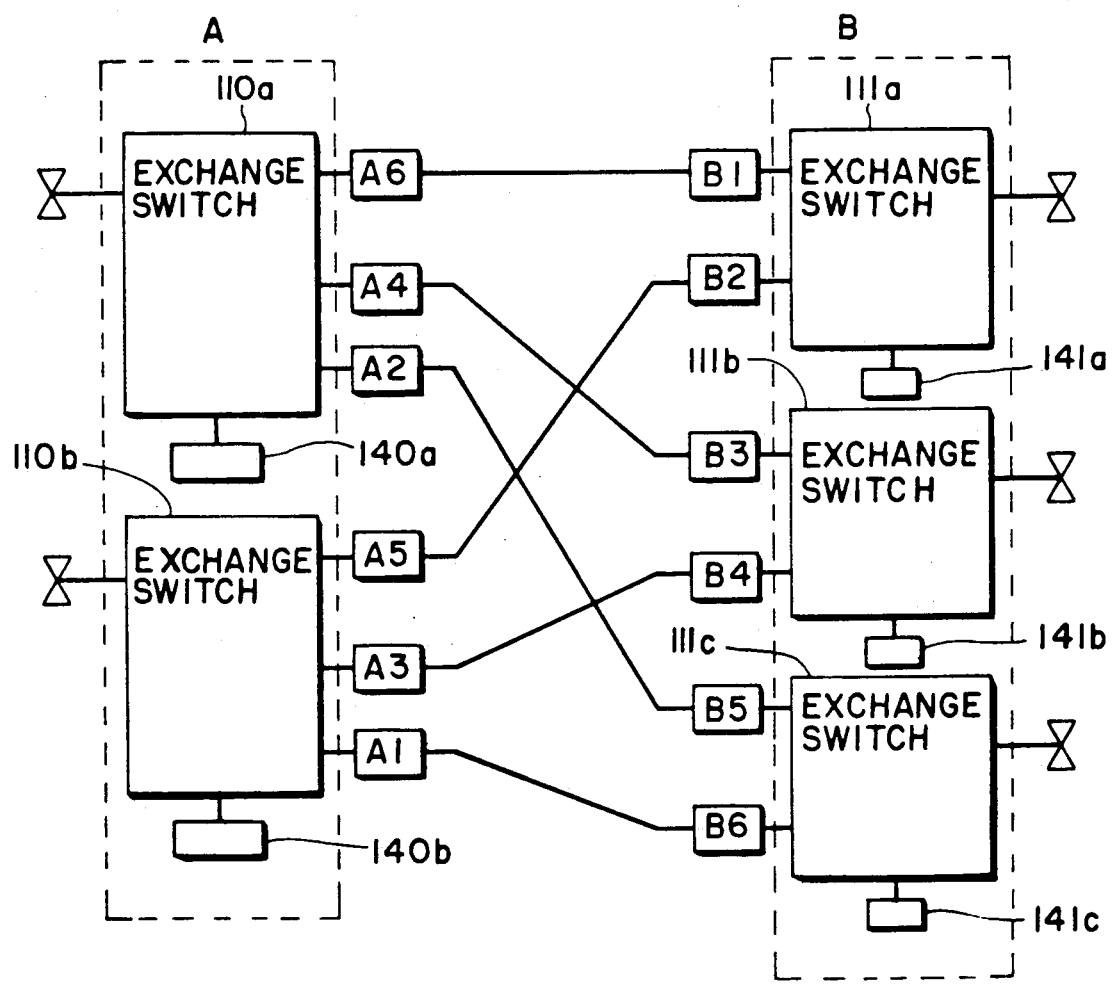
FIG. 4 is a block diagram for explaining the problem of a conventional multiprocessor arrangement.

In FIG. 4, an office A comprises an exchange switch 110a controlled by a controller 140a, and an exchange switch 110b controlled by a controller 140b. An opposite office B comprises an exchange switch 111a controlled by a controller 141a, an exchange switch 111b controlled by a controller 141b, and an exchange switch 111c controlled by a controller 141c. The office A assigns priorities to circuits in the order of A1 to A6. Circuits having the priorities A2, A4, and A6 are accommodated in the exchange switch 110a, while circuits having the priorities A1, A3, and A5 are accommodated in the exchange switch 110b. The office B assigns priorities to circuits in the order of B1 to B6. Circuits having the priorities B1 and B2 are accommodated in the exchange switch 111a, circuits having the priorities B3 and B4 in the exchange switch 111b, and circuits having the priorities B5 and B6 in the exchange switch 111c.

The office A must hunt circuits in the priority order of A1 to A6. The controllers 140a and 140b for the exchange switches 110a and 110b of the primary office A are, however, separately disposed, so that it may be difficult to hunte the circuits in the above priority order.

When a controller originates a two-way line hunting request, this request will be handled through a smaller amount of processes, if a two-way line to be hunted exists in an exchange switch to which the controller in question is connected. To realize this, however, the above priority order is difficult to effectively follow. In other words, the number of processes must be increased to follow the above priority order, in the multiprocessor system.

Next, embodiments of the present invention will be described.

Figure 5:
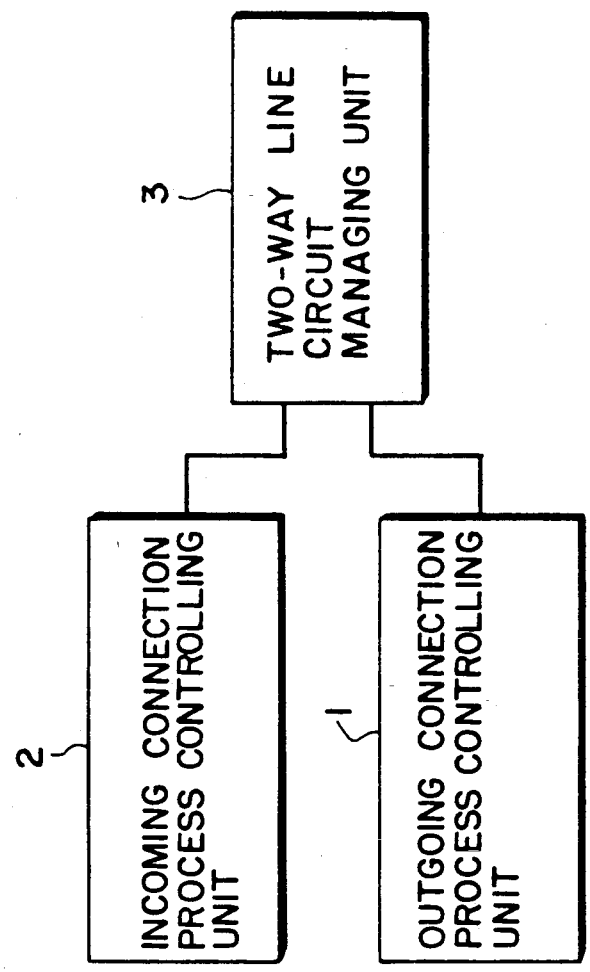
FIG. 5 is a block diagram showing the principle of a system according to the present invention.

FIG. 5 is a block diagram showing the principle of a system according to an embodiment of the present invention. In the figure, numeral 1 denotes an outgoing connection process controlling unit for detecting a release of a two-way line activated by a primary office to which the system belongs. Numeral 2 denotes an incoming connection process controlling unit for detecting a release of a two-way line activated by an opposite office. Numeral 3 denotes a two-way line managing unit for deciding the priorities for selection of a plurality of two-way lines. The two-way line managing unit 3 provides a different selection priority to a released two-way line depending on whether the released two-way line had been activated by the primary office or by the opposite office. These units 1, 2, and 3 are included in a central controller (CC) in a call processor (CPR) (see FIG. 1).

According to an aspect of the present invention, the two-way line managing unit 3 selects a first two-way line from a list of free two-way lines, connects a released two-way line to the top of the list if the released two-way line is decided by the outgoing connection process controlling unit 1 as the one activated by the primary office, and connects the released two-way line to the end of the list if the released two-way line is decided by the incoming connection process controlling unit 2 as the one activated by the opposite office. The list of free two-way lines is stored in the main memory (MM) 118 (see FIG. 1).

According to another aspect of the present invention, the two-way line managing unit 3 connects two-way lines to a list of high-priority free circuits and a list of low-priority free circuits. When the primary office intends to select and use a free two-way line, the two-way line managing unit 3 selects one from the list of high-priority free circuits. If no free circuit is found in the list of high-priority free circuits, one is selected from the list of low-priority free circuits. When the outgoing connection process controlling unit 1 detects that a two-way line activated by the primary office is to be released, the two-way line managing unit 3 connects the released two-way line to the list of high-priority free circuits. When the incoming connection process controlling unit 2 detects that a two-way line activated by the opposite office is to be released, the two-way line managing unit 3 connects the released two-way line to the list of low-priority free circuits.

Depending on whether a circuit to be released had been hunted by the primary office or by the opposite office, a priority for the next hunting of the released circuit is set differently, so that a two-way line previously hunted by the primary office may be hunted again by the primary office more easily than one previously hunted by the opposite office. Accordingly, irrespective of the type of system (the first or the second conventional system, or the system of the present invention) employed by the opposite office, a high priority circuit in the opposite office will be a circuit of low priority in the primary office, thereby decreasing a probability of occurrence of double hunting.

As a practical means to assure different priorities, the two-way lines are managed with a list of free two-way lines. The list is stored in the main memory (MM) 118 (see FIG. 1), and consists of labels of the two-way lines 130. When the primary office intends to select and use a free two-way line, a first one in the list is selected. When a circuit activated by the primary office is released, the circuit is connected to the top of the list, and a circuit activated by the opposite office is connected to the end of the list when released.

Another practical means to assure different priorities is to connect the two-way lines to a list of high-priority free circuits and a list of low-priority free circuits. When the primary office intends to select and use a free two-way line, one is searched for in the list of high-priority free circuits. If no free circuit is found in the list of high-priority free circuits, one is selected from the list of low-priority free circuits. When a circuit activated by the primary office is released, the circuit is connected to the list of high-priority free circuits, and when a circuit activated by the opposite office is released, the circuit is connected to the list of low-priority free circuits.

FIG. 6 is a block diagram showing in more detail the two-way line managing system shown in FIG. 5. In the figure, numerals 1, 2, and 3 denote an outgoing connection process controlling unit, incoming connection process controlling unit, and two-way line managing unit, respectively, which correspond to those of FIG. 5. Numeral 4 denotes a trunk controlling unit. These units are supposed to belong to a primary office and are included in a central controller (CC).

The outgoing connection process controlling unit 1 provides the trunk controlling unit 4 with an activation signal transmitting request (a) when a two-way line is to be used, and provides the trunk controlling unit 4 with a release signal transmitting request (b) when an outgoing connection circuit being used is to be released. When a response is received from an opposite office during the use of a two-way line, or when a two-way line is released by the opposite office, the trunk being used at that time is informed from the trunk controlling unit 4 to the outgoing connection process controlling unit 1.

Further, the outgoing connection process controlling unit 1 provides the two-way line managing unit 3 with a trunk using request when a two-way line is to be used, and provides the two-way line managing unit 3 with an outgoing connection releasing request when a two-way line being used is to be released.

The incoming connection process controlling unit 2 is informed (d) from the trunk controlling unit 4 of an activation of a two-way line by the opposite office (d), and provides the two-way line managing means 3 with this information. To release an incoming connection circuit presently in use, a notice is issued by the incoming connection process controlling unit 2 to the two-way line managing unit 3. To respond to an activation by the opposite office, the incoming connection process controlling unit 2 provides the trunk controlling unit 4 with a response signal transmitting request. To release a two-way line activated by the opposite office, the incoming connection process controlling unit 2 provides the trunk controlling unit 4 with a release signal transmitting request.

When a circuit is activated by the opposite office or when the opposite office provides a releasing instruction, it is informed from the trunk controlling unit 4 to the incoming connection process controlling unit 2.

Figure 7B:
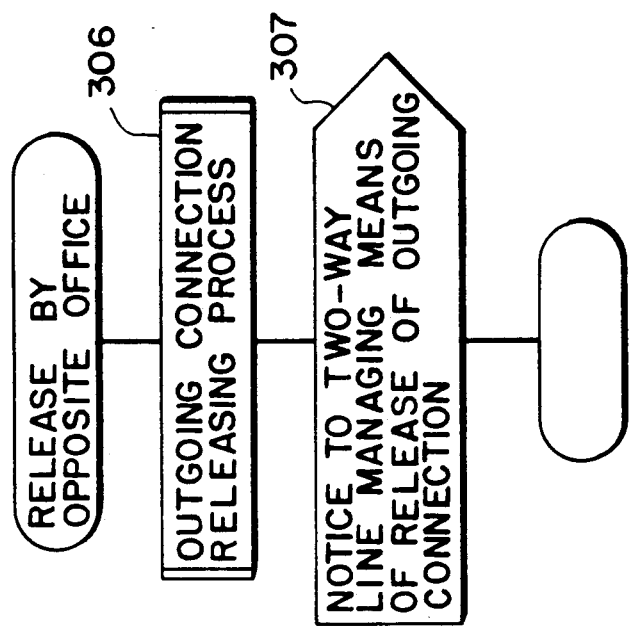
Figure 7A:
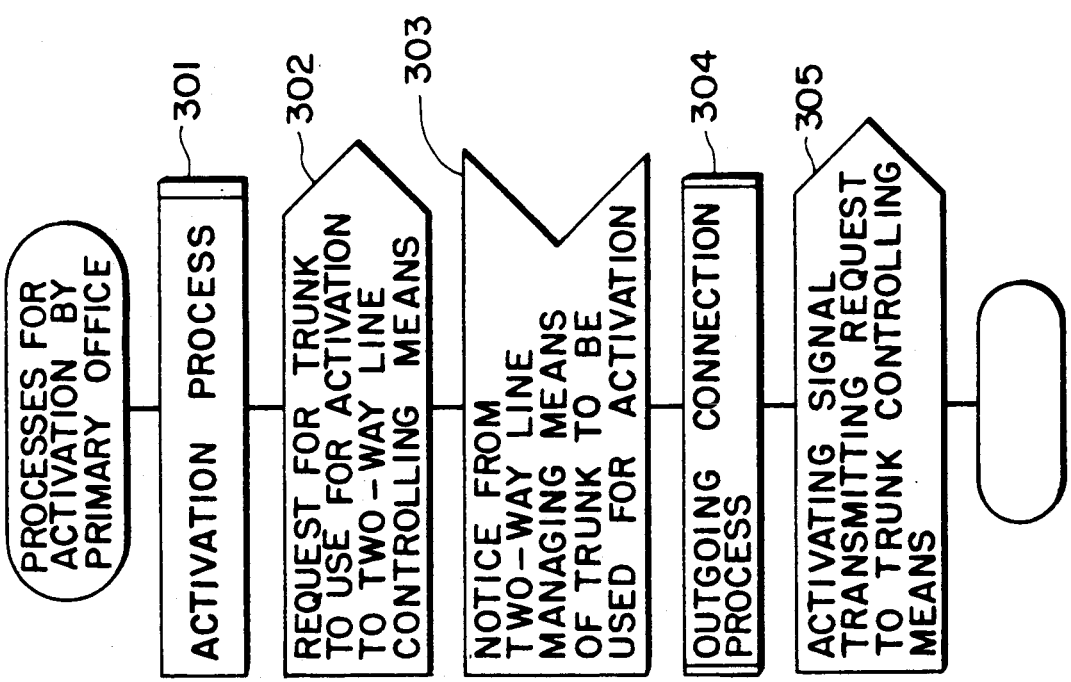

FIGS. 7A to 7D show flowcharts for explaining operations of the outgoing connection process controlling unit 1. FIG. 7A is a flowchart showing an activating process initiated by the primary office; FIG. 7B is a flowchart showing a releasing process initiated by the opposite office; FIG. 7C is a flowchart showing a releasing process initiated by the primary office; and FIG. 7D is a flowchart showing a response receiving process.

In the flowchart shown in FIG. 7A, the primary office starts the activating process in Step 301. In Step 302, a trunk request for activating a two-way line is provided from the outgoing connection process controlling unit 1 to the two-way line managing unit 3. In Step 303, a trunk to be used for the activation is informed from the two-way line managing unit 3 to the outgoing connection process controlling unit 1. In Step 304, an outgoing connection process is carried out. In Step 305, an activating signal transmitting request is provided from the outgoing connection process controlling unit 1 to the trunk controlling unit 4, thereby completing the activating process.

In the flowchart shown in FIG. 7B, when the opposite office is ready to end the communication, an outgoing connection releasing process is effected in Step 306 by the primary office according to a request from an outgoing trunk or two way trunk in the opposite office. In Step 307, an outgoing connection releasing request is provided from the outgoing connection process controlling unit 1 to the two-way line managing unit 3.

In the flowchart shown in FIG. 7C, an outgoing connection releasing process is started in Step 308 according to a request from the primary office. In Step 309, the outgoing connection process controlling unit 1 provides the trunk controlling unit 4 with a release signal transmitting request. In Step 310, the outgoing connection process controlling unit 1 informs the two-way line managing unit 3 of a release of outgoing connection.

The flowchart in FIG. 7D shows a process related to a response of the opposite office that is informed through the trunk controlling unit 4. In Step 311, the outgoing connection responding process is carried out.

FIGS. 8A to 8D show flowcharts of operations of the incoming connection process controlling unit 2. In the figure, the flowchart in FIG. 8A is for processing an activation request of the opposite office; the flowchart in FIG. 8B is for processing of a release request of the opposite office; the flowchart in FIG. 8C is for processing of a release request of the primary office, and the flowchart in FIG. 8D is for processing of a response of the primary office.

In the flowchart in FIG. 8A, an activating request of the opposite office is firstly informed through the trunk controlling unit 4. In Step 401, an activation acceptance process is carried out by the incoming connection process controlling unit 2. In Step 402, the activating request of the opposite office is informed from the incoming connection process controlling unit 2 to the two-way line managing unit 3. In Step 403, an incoming connection process is carried out by the incoming connection process controlling unit 2.

In the flowchart in FIG. 8B, a release request from the opposite office is informed through the trunk controlling unit 4. In Step 404, an incoming connection releasing process is carried out in the incoming connection process controlling unit 2. In Step 405, the incoming connection process controlling unit 2 informs the two-way line managing unit 3 of a release of incoming connection.

In the flowchart in FIG. 8C, a releasing request is provided by the primary office, and an incoming connection releasing process is carried out in Step 406. In Step 407, the incoming connection process controlling unit 2 provides the trunk controlling unit 4 with a release signal transmitting request. In Step 408, the incoming connection process controlling unit 2 informs the two-way line managing unit 3 of a release of incoming connection.

In the flowchart in FIG. 8D, a response from the primary office is processed. In Step 409, an incoming connection response process is carried out. In Step 410, the incoming connection process controlling unit 2 provides the trunk controlling unit 4 with a response signal transmitting request.

Figure 9B:
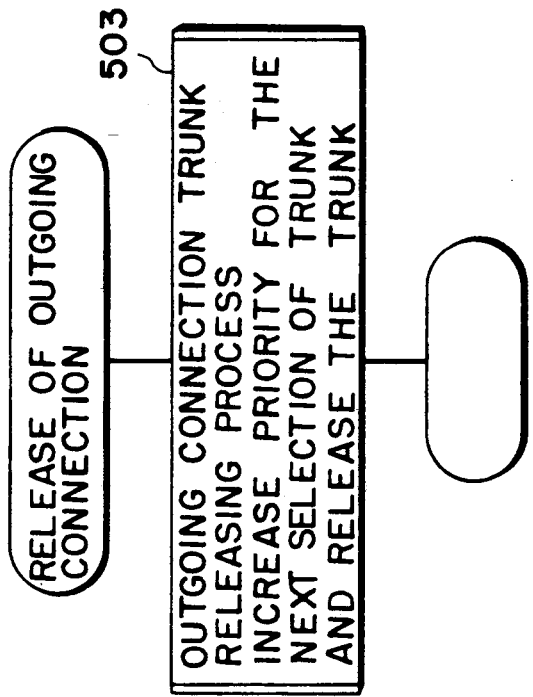
FIGS. 9A to 9D show flowcharts for explaining the operations of two-way line managing means shown in FIG. 6.
Figure 9A:
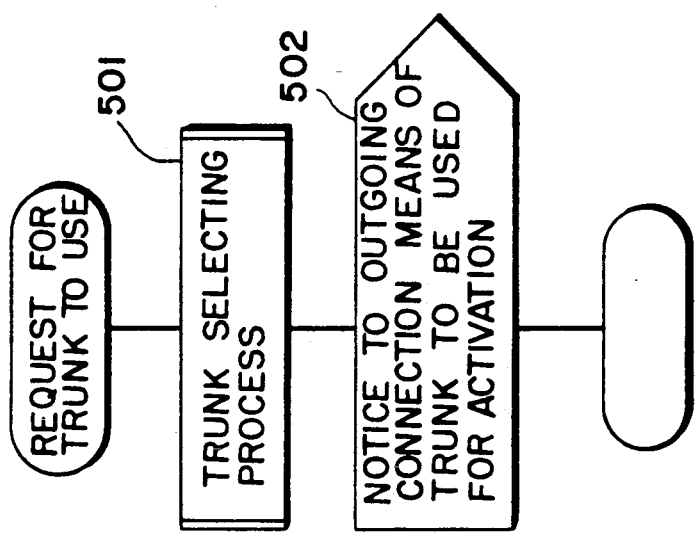
Figure 9D:
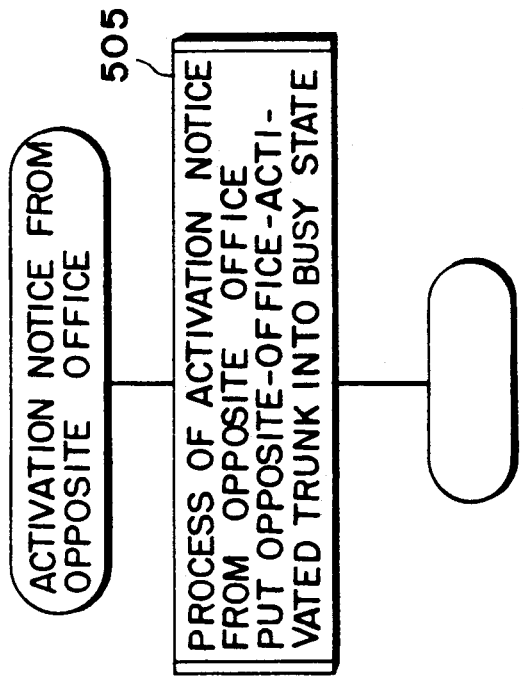
Figure 9C:
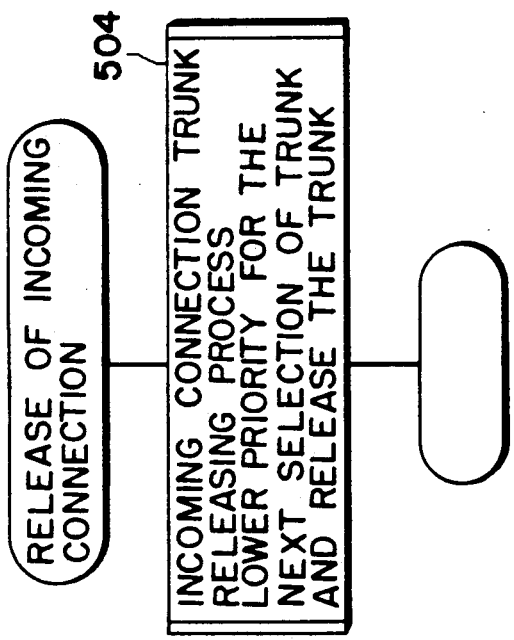

FIGS. 9A to 9D show flowcharts of operations of the two-way line managing unit 3. The flowchart in FIG. 9A shows a trunk requesting process; the flowchart in FIG. 9B shows an outgoing connection releasing process; the flowchart in FIG. 9C shows an incoming connection releasing process, and the flowchart in FIG. 9D shows a process for handling an activation notice of the opposite office.

In the flowchart in FIG. 9A, a trunk using request is provided from the outgoing connection process controlling unit 1. In Step 501, the two-way line managing unit 3 selects a trunk among free trunks. In Step 502, the two-way line managing unit 3 informs the outgoing connection process controlling unit 1 of a trunk to be used for activating a two-way line.

In the flowchart in FIG. 9B, an outgoing connection releasing request is provided from the outgoing connection process controlling unit 1. In Step 503, a priority for the next selection of an outgoing connection trunk to be released is increased, and then the trunk is released.

In the flowchart in FIG. 9C, an incoming connection releasing request is provided from the incoming connection process controlling unit 2. In Step 504, a priority for the next selection of an incoming connection trunk to be released is decreased, and the trunk is released.

In the flowchart in FIG. 9D, the trunk controlling unit 4 informs the incoming connection process controlling unit 2 of an activation notice of the opposite office. In Step 505, the notice is received by the two-way line managing unit 3, which then carries out an activation informing process such as putting a trunk activated by the opposite office into a busy state.

A trunk hunting process and a trunk releasing process according to a first embodiment of the invention will be explained with reference to FIGS. 10A to 10D and 11A to 11D.

Figure 10A:
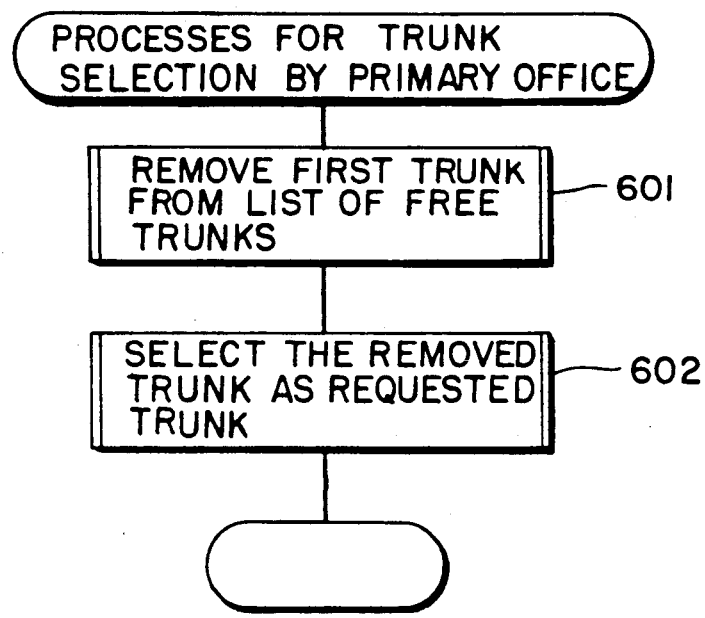
FIGS. 10A to 10D explain a trunk hunting process according to a first embodiment of the invention.
Figure 10B:
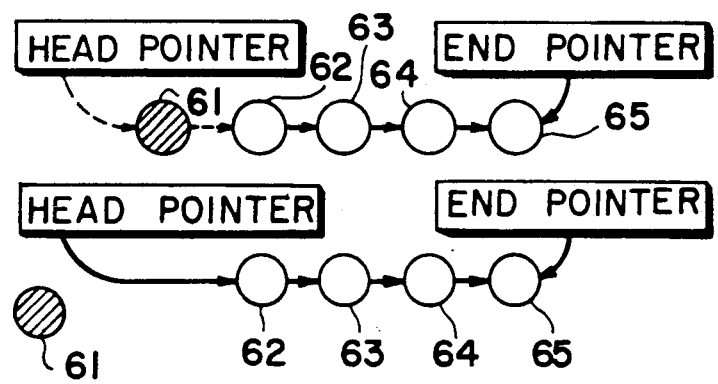
Figure 10C:
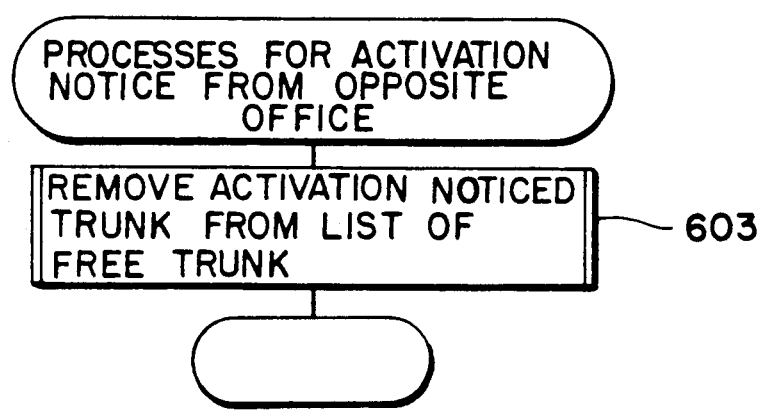
Figure 10D:
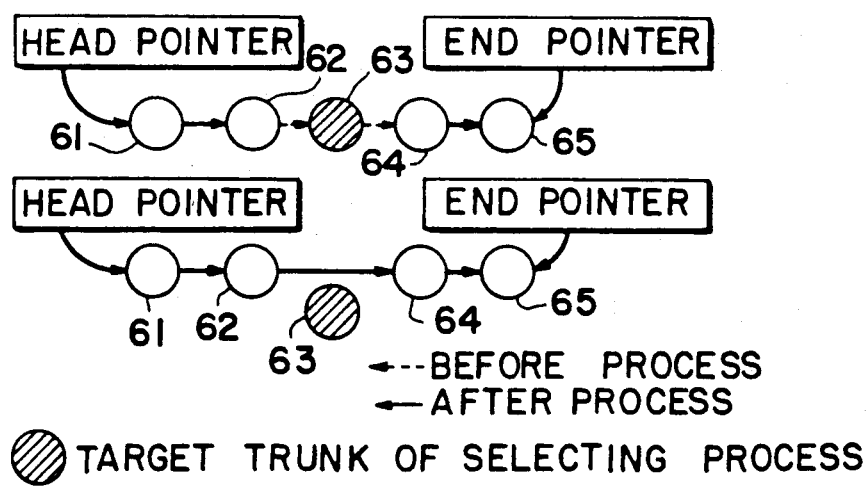

FIGS. 10A to 10D explain the trunk hunting process according to the first embodiment of the invention. In the figures, a flowchart in FIG. 10A and the diagram in FIG. 10B show the trunk hunting process for an activation request of the primary office, with views showing priority shifting states of trunks; and a flowchart in FIG. 10C and the diagram in FIG. 10D show the trunk hunting process for an activation request of the opposite office, with views showing priority shifting states of trunks. The trunk hunting process is substantially the same as the hunting process of a two-way line, so that the following explanation will be made for only the trunk hunting process.

In the flowchart in FIG. 10A and in the diagram in FIG. 10B, before the trunk hunting (selecting) process for the primary office is started, assuming a state in which a free trunk list contains two way trunks 61, 62, 63 64, and 65 arranged in the order of priorities, and a head pointer of the list is connected to the trunk 61 having a highest priority and an end pointer thereof to the trunk 65 having a lowest priority. In Step 601, the trunk 61 connected to the head pointer in the free trunk list is removed from the list. Thereafter, the head pointer is connected to the trunk 62 in the free trunk list. Namely, the head pointer is moved from a position indicated with a dotted line to a position indicated with a continuous line in the figure. In Step 602, the trunk 61 removed from the free trunk list is selected as a required trunk. At this moment, the head pointer of the free trunk list is still connected to the trunk 62.

In the flowchart in FIG. 10C and the diagram in FIG. 10D, the opposite office provides an activation notice for the trunk 63 for example, in the free trunk list. In Step 603, the trunk 63 is removed from the free trunk list and hunted. At this moment, the free trunk list contains the trunks 61, 62, 64, and 65, and the trunk 63 cannot be hunted by the primary office.

Figure 11B:
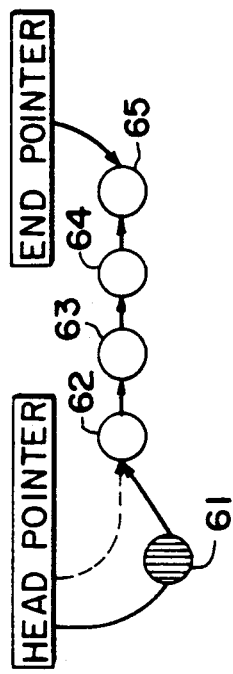
FIGS. 11A to 11D explain a trunk releasing process according to the first embodiment of the invention.
Figure 11D:
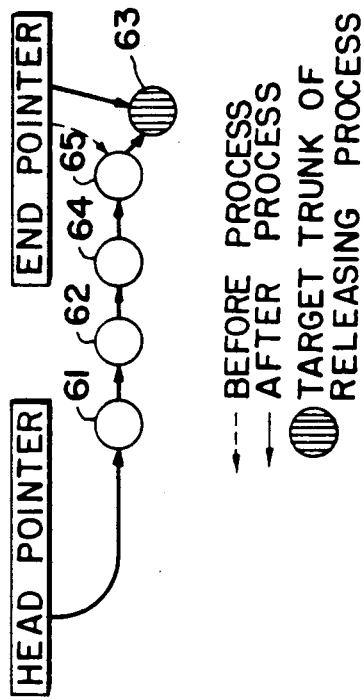

FIGS. 11A to 11D explain the trunk releasing process according to the first embodiment of the invention. In the figure, a flowchart in FIG. 11A and a diagram in FIG. 11B show a process of releasing an outgoing connection trunk, with views showing the changing states of the free trunk list, and a flowchart in FIG. 11C and a diagram in FIG. 11D show a process of releasing an incoming connection trunk, with views showing the changing states of the free trunk list.

Figure 11A:
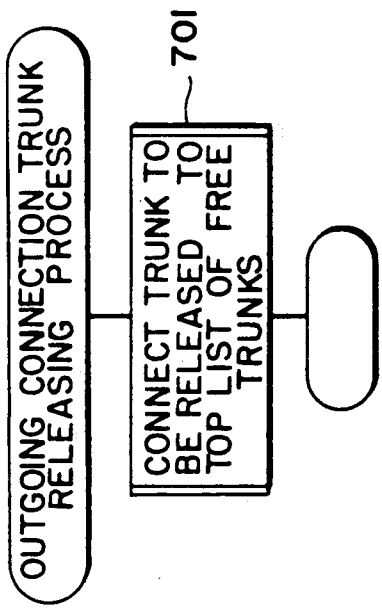

In the flowchart in FIG. 11A and in the diagram in FIG. 11B, when the trunk 61 selected by the primary office as described with reference to FIGS. 10A and 10B is to be released, namely, when the process of releasing an outgoing connection trunk is to be executed, in Step 701, the trunk 61 is connected to the top of the free trunk list. Consequently, the trunk 61 will have the highest priority in the free trunk list. The next time the primary office intends to hunt a two-way line, the released trunk 61 will be selected and hunted.

Figure 11C:
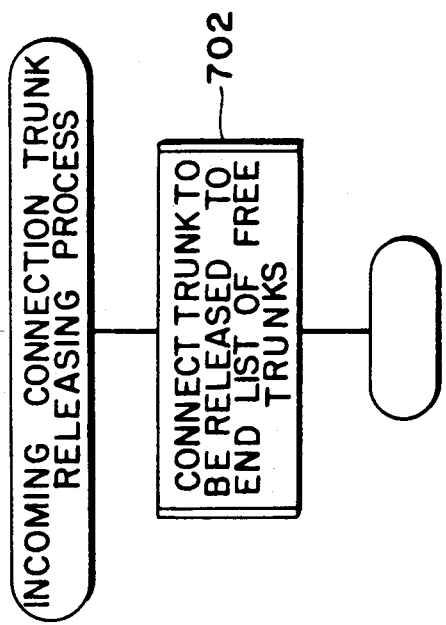

In the flowchart in FIG. 11C and the diagram in FIG. 11D, when the trunk 63 hunted by the opposite office in FIG. 6(b) is to be released, in Step 702, the trunk 63 is connected to the last of the free trunk list. Consequently, the trunk 63 will have the lowest priority in the free trunk list. Namely, when a two-way line hunted by the opposite office is released, the circuit will have the lowest priority for the next hunt by the primary office.

Generally, a call controlling process differs depending on whether a hunt is made by the primary office or by the opposite office. It is easy, therefore, to distinguish whether a released circuit had been hunted by the primary office or by the opposite office.

If both the offices employ the control system shown in FIGS. 10A to 10D and 11A to 11D and if the hunt and release of two-way lines are repeated a certain number of times, the circuit having a highest priority in a free circuit list of the primary office will be brought to the end of a free circuit list of the opposite office. Since both of the offices hunt a two-way line from the top of their free circuit lists, the probability of occurrence of simultaneous hunting is reduced remarkably.

If the opposite office adopts the first prior-art system (FIG. 2) and the primary office adopts the system of the first embodiment of the present invention, the opposite office may hunt two-way lines in the predetermined order of priorities, while the primary office puts a released circuit that had been hunted by the opposite office at the end of the free circuit list. Accordingly, circuits having higher priorities in the opposite office are brought to a lower part of the free circuit list of the primary office. Meanwhile, the primary office will hunt a circuit that has not been hunted by the opposite office, and the probability of simultaneous hunting is therefore reduced.

A trunk hunting process and a trunk releasing process according to a second embodiment of the present invention will be explained with reference to FIGS. 12A and 12B, FIGS. 13A and 13B, and FIGS. 14A to 14D.

Figure 12A:
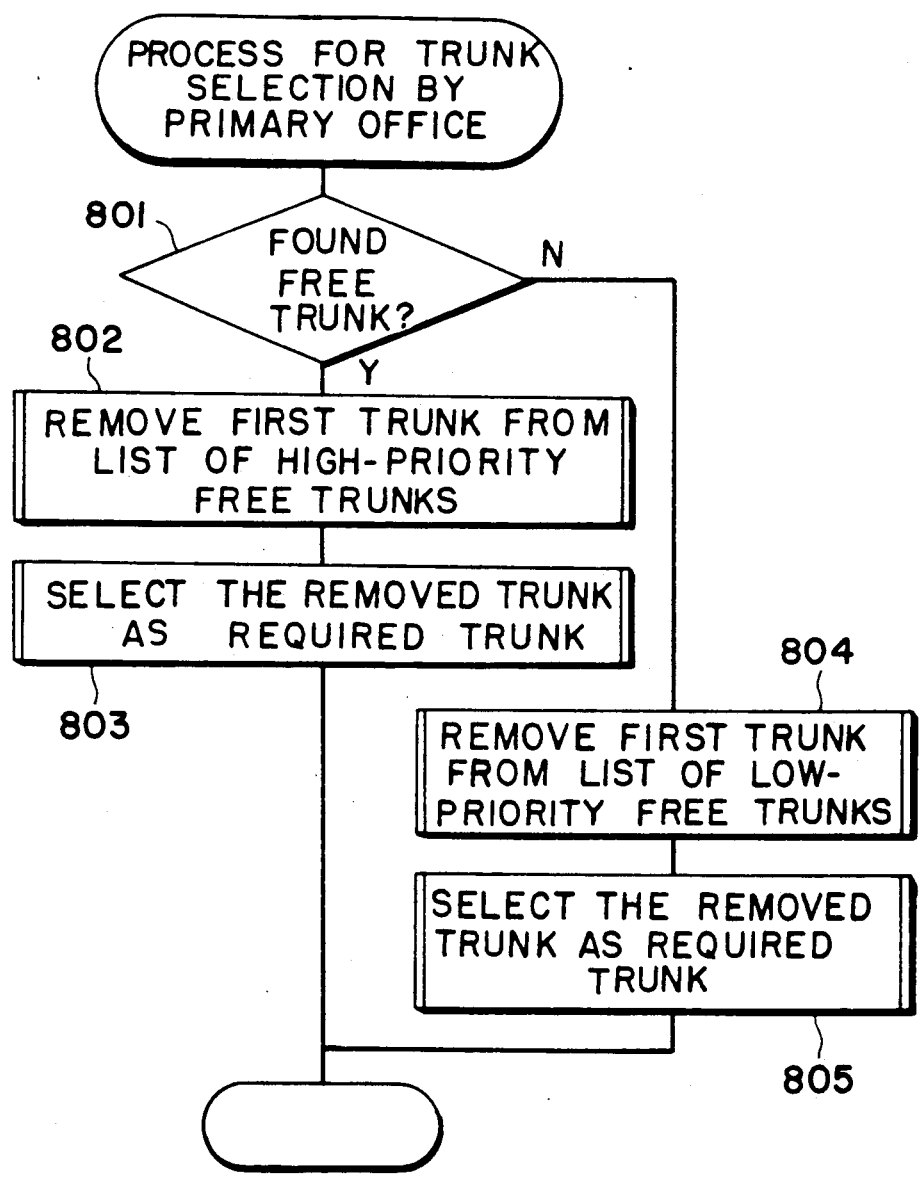
FIGS. 12A and 12B explain a process of trunk hunting from a primary station, according to a second embodiment of the invention.
Figure 12B:
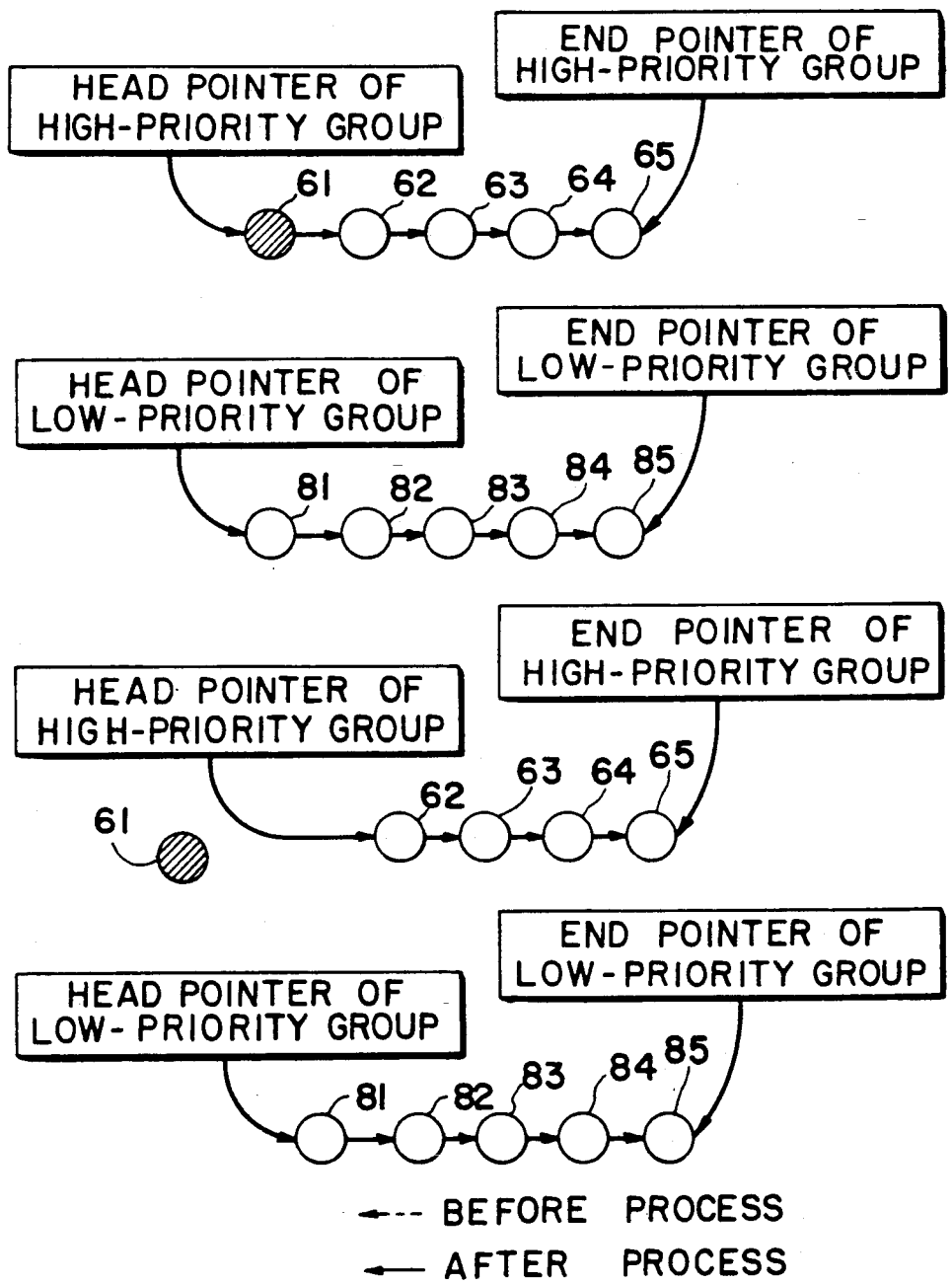

FIGS. 12A and 12B explain the trunk hunting process according to the second embodiment of the invention. In this embodiment, the two-way line managing unit 3 selects a trunk connected to a two-way line in a first list of labels of free trunks or in a second list of free trunks. The first list and the second list are stored in the main memory (MM) 118 (see FIG. 1). The first list stores labels of free trunks or free two-way lines arranged in an order of priority from the top to the bottom. The second list stores labels of free two-way lines arranged in a random order from the top to the bottom. In the figures, the first list of free trunks contains two-way trunks 61, 62, 63, 64, and 65 arranged in the order of priority to be used, and the second list contains two-way trunks 81, 82, 83, 84, and 85 arranged randomly without priority. When a trunk is selected according to a request from the primary office, Step 801 judges whether or not a free trunk is listed in the first list. If the result is YES, the label of a trunk connected to a head pointer of the first list is removed from the first list in Step 802, and the trunk is selected as a required trunk in Step 803. If no free trunk is found in the first list in Step 801, a lable of a trunk connected to a head pointer of the second list is removed from the list, and selected as a required trunk in Step 805.

Figure 13B:
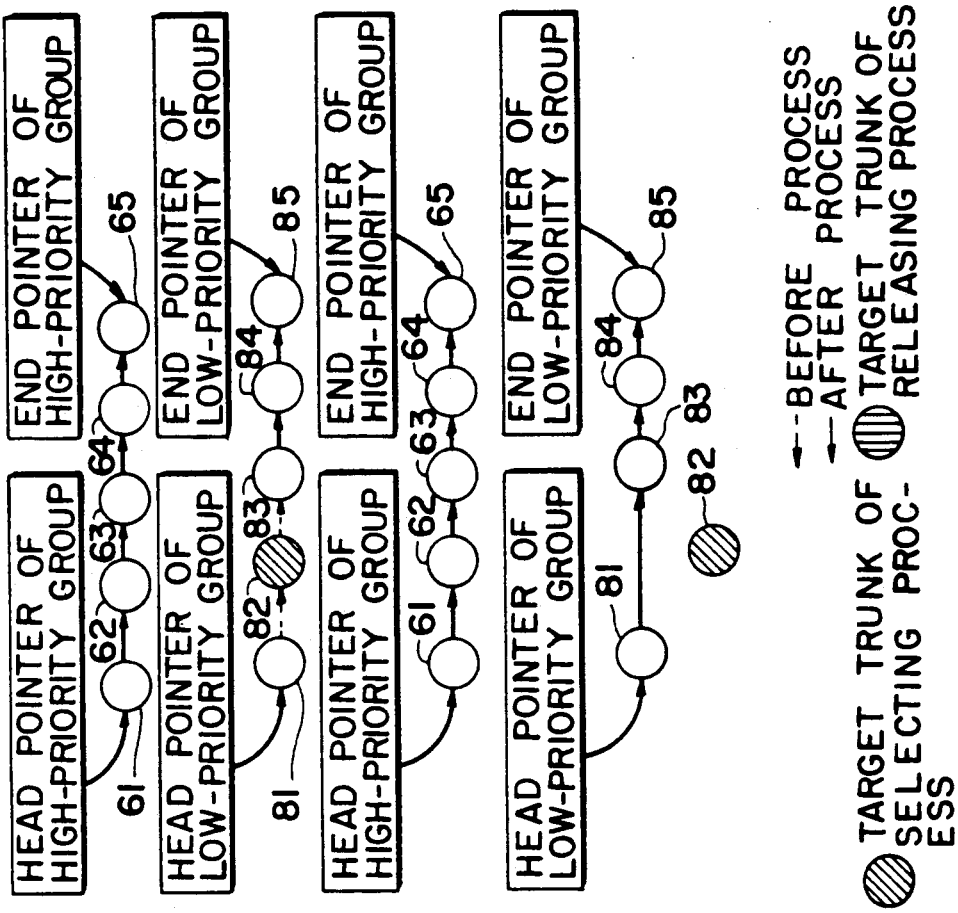
FIGS. 13A and 13B explain a process of trunk hunting from an opposite station, according to the second embodiment of the invention.
Figure 13A:
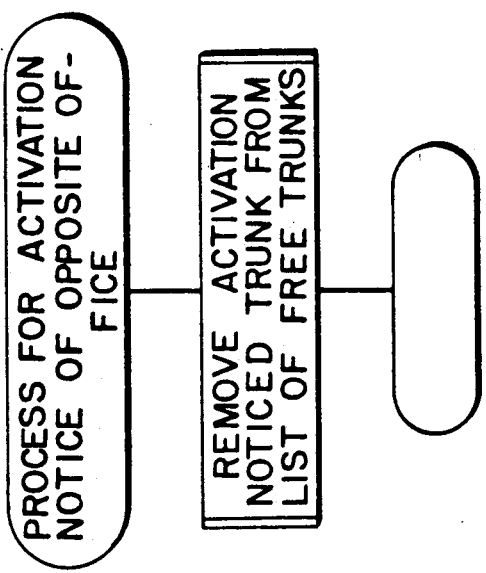

FIGS. 13A and 13B explain the trunk hunting process from the opposite office, according to the second embodiment of the invention. In this case, a label of a trunk for which an activation request is made by the opposite office is removed from the first or the second list regardless of whether the label is in the first list or in the second list. In the case of FIGS. 13A and 13B, a label of a trunk 82 which is a target of the activation is in the second list.

Figure 14A:
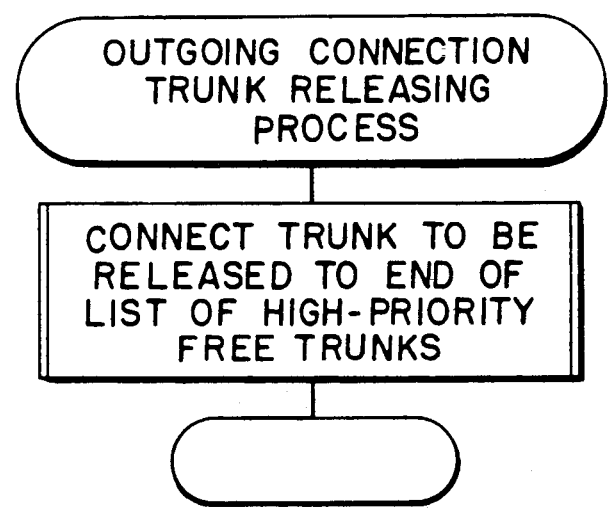

FIGS. 14A to 14D explain the trunk releasing process according to the second embodiment of the invention. In the figures, a flowchart in FIG. 14A and a diagram in FIG. 14B show an outgoing connection trunk releasing process, i.e., a process of releasing a trunk hunted by the primary office, and a flowchart in FIG. 14C and a diagram in FIG. 14D show an incoming connection trunk releasing process, i.e., a process of releasing a trunk hunted by the opposite office.

In the flowchart shown in FIG. 14A and the diagram in FIG. 14B, when a trunk hunted by the primary office is released, the trunk to be released is connected to an end pointer of the first list, irrespective of whether the trunk to be released has been hunted from the high-priority trunks or from the low-priority trunks. Instead of connecting the trunk to be released to the end pointer of the first list, the trunk may be connected to any pointer such as a head pointer of the first list.

Figure 14C:
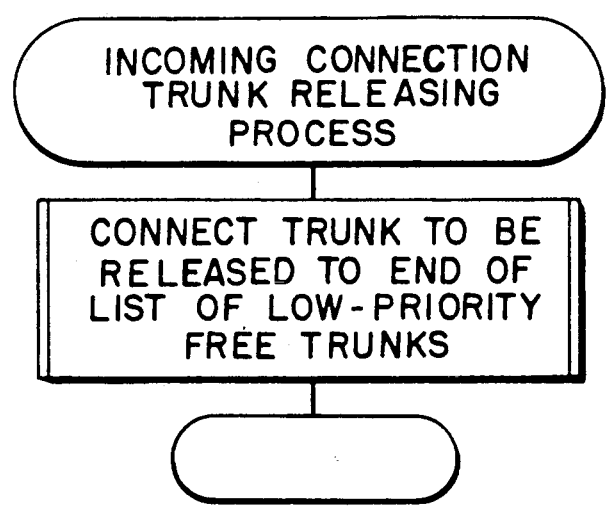

In the flowchart shown in FIG. 14C and the diagram shown in FIG. 14D, a trunk hunted by the opposite office is released. The trunk to be released is connected to an end pointer of the second list, irrespective of whether the trunk to be released has been hunted from the high-priority trunks or from the second trunks. Instead of connecting the trunk to be released to the end pointer of the second list, the trunk may be connected to a head pointer of the second list.

In the second embodiment also, when a two-way line hunted by the primary office is released, it is connected to the first list, and when a circuit hunted by the opposite office is released, it is connected to the second list, thereby reducing the probability of simultaneous hunting of the same circuit by the two offices. The opposite office may adopt any of the embodiments of the present invention or any of the conventional systems, and the primary office can decide its own system without considering the system of the opposite office.

As apparent from the above explanation, the present invention can provide a two-way line managing system that can reduce the probability of double hunting, irrespective of a managing system adopted by an opposite office. Further, the following effects are provided by the invention:

(1) It is not necessary to reversely set the priorities of two-way lines in two offices as the priorities are automatically determined according to the states of usage of the circuits, so that troubles in system designing may be eliminated.

(2) Even if the priorities of two-way lines are not reversely set in both offices at the beginning, the priorities will automatically be adjusted through the repetition of hunt by both of the offices, thereby gradually reducing the probability of double hunting.

We claim:

1. A switching system having a plurality of two-way lines connected between a primary office and an opposite office for communicating through a selected one of said plurality of two-way lines, said primary office having control means for selecting one of said plurality of two-way lines to be used for communication, said control means comprising:
   outgoing connection process controlling means for detecting a release of a two-way line which has been activated by said primary office;
   incoming connection process controlling means for detecting a release of a two-way line which has been activated by said opposite office; and
   two-way line managing means for deciding a priority for selection of a plurality of two-way lines and for modifying the priority depending on whether the released two-way line had been activated by the primary office or by the opposite office.

2. A switching system as claimed in claim 1 further comprising a plurality of trunks for carrying two-way lines, and for sending and receiving signals through said two-way lines.

3. A switching system as claimed in claim 2, wherein said control means further comprises trunk controlling means for controlling said trunks, one of said trunks being selected by said two-way line managing means when said primary office initiates activation of a two-way line.

4. A switching system as claimed in claim 3 wherein said trunk controlling means comprises means for informing, when an activation is effected by said opposite office, an activation signal from said opposite office to said incoming connection process control means in said primary office and for informing, when a release of the two-way line is required by said opposite office, a release signal to said incoming connection process control means in said primary office.

5. A switching system as claimed in claim 3 wherein said outgoing connection process controlling means comprises:
   activation signal transmission requesting means for providing said trunk controlling means with an activation signal transmission request when a two-way line is to be used;
   release signal transmission requesting means for providing said trunk controlling means with a release signal transmission request when an outgoing connection circuit being used is to be released; and
   trunk notice receiving means for receiving, from said two-way line managing means a notice of a trunk being used when a response is received from said opposite office or when a two-way line is released by said opposite office.

6. A switching system as claimed in claim 3 wherein said incoming connection process controlling means comprises:
   activation signal accepting means for receiving information indicating that a two-way line is being activated by said opposite office and for informing said information to said two-way line managing means;
   incoming connection releasing means for informing said two-way line managing means of release of an incoming connection for carrying a two-way line when said incoming connection is released, and
   incoming connection responding means for requesting said trunk controlling means to transmit a response signal to said opposite office when a response is to be transmitted from said primary office to said opposite office.

7. A switching system as claimed in claim 3 wherein said two-way line managing means comprises:
   trunk selecting means for selecting a trunk in response to a request to use a trunk from said outgoing connection control means in accordance with said priority for selection of said two-way lines;
   outgoing connection trunk releasing means for increasing the priority for the next selection of the trunk and for releasing said trunk being used when said primary office initiates release of a two-way line;
   incoming connection trunk releasing means for lowering the priority for the next selection of trunk and for releasing said trunk being used when said opposite office initiates release of a two-way line; and
   activation notifying signal receiving means for receiving a notification of an activation of a two-way line from said opposite office through said trunk controlling means and said incoming connection process controlling means to said two-way line managing means to put a trunk required by said opposite office into a busy state.

8. A switching system as claimed in claim 5 wherein said activation signal transmission requesting means in said outgoing connection process controlling means comprises:

activation processing means for providing said trunk controlling means with an activation signal transmitting request when one of said two-way lines is to be used;

two-way line requesting means for requesting a two-way line to be used to said trunk controlling means;

two-way line notice receiving means for receiving a notice of a two-way line to be used from said trunk controlling means; and activation signal transmit requesting means for requesting said trunk controlling means to transmit an activation signal to activate a two-way line to be used.

9. A switching system as claimed in claim 5 wherein said outgoing connection releasing means in said outgoing connection process controlling means further comprises release of outgoing connection informing means for informing the end of said outgoing connection release process to said two-way line managing means.

10. A switching system as claimed in claim 5 wherein said trunk notice receiving means in said outgoing connection process controlling means further comprises:

outgoing connection releasing means for releasing the outgoing connection in response to a request from said primary office;

release signal transmit requesting means for requesting a release signal to release the outgoing connection; and release of outgoing connection informing means for informing the end of said outgoing connection release process to said two-way line managing means.

11. A switching system as claimed in claim 1 further comprising a memory for storing a list of labels of free two-way lines arranged in an order from the top to the bottom, wherein said two-way line managing means comprises:

two-way line selecting means for selecting one two-way line to be used among said plurality of two-way lines from the top of the label list of free two-way lines; and a label storing means for storing a label of a released two-way line into said list of labels of free two-way lines, the label of a released two-way line immediately before being stored in the top of said list when said released two-way line is detected by said outgoing connection controlling means as the one activated by said primary office, and said label of a released two-way line being stored in the end of said list when said released two-way line is decided by said incoming connection controlling means as the one activated by said opposite office.

12. A switching system as claimed in claim 11 further comprising a switching network, operatively connected to said plurality of two-way lines and said control means, for effecting a switching operation under the control of said control means.

13. A switch system as claimed in claim 12 further comprising a plurality of two-way trunks for carrying said plurality of two-way lines and said switching network for sending and receiving signals through said plurality of two-way lines;

each of said plurality of two-way trunks being selected to be used for carrying lines or released from carrying lines under the control of said control means.

14. A switching system as claimed in claim 13 wherein said trunk controlling means comprises means for informing, when an activation signal is effected by said opposite office, an activation signal from said opposite office to said incoming connection process control means in said primary office, and for informing, when a release of the two-way line is required by said opposite office, a release signal to said incoming connection process control means in said primary office.

15. A switching system as claimed in claim 14 wherein said outgoing connection process controlling means comprises:

activation signal transmission requesting means for providing said trunk controlling means with an activation signal transmission request when a two-way line is to be used;

release signal transmission requesting means for providing said trunk controlling means with a release signal transmission request when an outgoing connection circuit being used is to be released; and trunk notice receiving means for receiving, from said two-way line managing means a notice of trunk being used when a response is received from said opposite office or when a two-way line is released by said opposite office.

16. A switching system as claimed in claim 14 wherein said incoming connection process controlling means comprises:

activation signal accepting means for receiving information of a two-way line being activated by said opposite office and for informing said information to said two-way line managing means;

incoming connection releasing means for informing said two-way line managing means of release of said incoming connection when said incoming connection is released; and incoming connection responding means for requesting said trunk controlling means to transmit a response signal to said opposite office when a response is to be transmitted from said primary office to said opposite office.

17. A switching system as claimed in claim 14 wherein said two-way line managing means comprises:

trunk selecting means for selecting a trunk in response to a request to use a trunk from said outgoing connection control means in accordance with said priority for selection of said two-way lines;

outgoing connection trunk releasing means for increasing the priority for the next selection of the trunk and for releasing said trunk being used when said primary office initiates release of a two-way line;

incoming connection trunk releasing means for lowering the priority for the next selection of trunk and for releasing said trunk being used when said opposite initiates release of a two-way line; and activation notifying signal receiving means for receiving a notification of an activation of a two-way line from said opposite office through said trunk controlling means and said incoming connection process controlling means to said two-way line managing means to put a trunk required by said opposite office into a busy state.

18. A switching system as claimed in claim 14 wherein said activation signal transmission requesting means in said outgoing connection process controlling means comprises:

activation processing means for providing said trunk controlling means with an activation signal transmitting request when one of said two-way lines is to be used;

two-way line requesting means for requesting a two-way line to be used to said trunk controlling means;

two-way line receiving means for receiving a two-way line to be used from said trunk controlling means; and activation signal transmit requesting means for requesting said trunk controlling means to transmit an activation signal to activate a two-way line to be used.

19. A switching system as claimed in claim 14 wherein said outgoing connection releasing means in said outgoing connection process controlling means further comprises release of outgoing connection informing means for informing the end of said outgoing connection release process to said two-way line managing means.

20. A switching system as claimed in claim 14 wherein said trunk notice receiving means in said outgoing connection process controlling means further comprises:

outgoing connection releasing means for releasing the outgoing connection in response to a request from said primary office;

release signal transmit requesting means for requesting a release signal to release the outgoing connection; and release of outgoing connection informing means for informing the end of said outgoing connection release process to said two-way line managing means.

21. A switching system as claimed in claim 1 further comprising a memory for storing a first list of labels of free two-way lines arranged in an order of priority from the top to the bottom and for storing a second list of labels of free two-way lines arranged in a random order form the top to the bottom, wherein said two-way line managing means comprises:

two-way line selecting means for selecting one free two-way line among said plurality of two-way lines from the top of the label in said list of free two-way lines when the free two-line is requested by said primary office, and if no free two-way line is found in said first list, for selecting one free two-way line from said second list;

first label storing means for storing a label of a released two-way line into said first list when said outgoing connection process controlling means detects that the two-way line activated by said primary office is released; and second label storing means for storing a label of a released two-way line into said second list when said incoming connection process controlling means detects that the two-way line activated by said opposite office is released.

22. A switching system as claimed in claim 21 further comprising a switching network, operatively connected to said plurality of two-way lines and said control means, for effecting a switching operation under the control of said control means.

23. A switching system as claimed in claim 22 further comprising a plurality of two-way trunks connected to said switching network, for carrying said plurality of two-way lines, and for sending and receiving signals through said plurality of two-way lines;

each of said plurality of two-way trunks being selected or released under the control of said control means.

24. A switching system as claimed in claim 23 wherein said trunk controlling means comprises means for informing, when an activation is effected by said opposite office, an activation signal from said opposite office to said incoming connection process control means in said primary office, and for informing, when a release of the two-way line is required by said opposite office, a release signal to said incoming connection process control means in said primary office.

25. A switching system as claimed in claim 24 wherein said outgoing connection process controlling means comprises:

activation signal transmission requesting means for providing said trunk controlling means with an activation signal transmission request when a two-way line is to be used;

release signal transmission requesting means for providing said trunk controlling means with a release signal transmission request when an outgoing connection circuit being used is to be released; and trunk notice receiving means for receiving, from said two-way line managing means a notice of trunk being used when a response is received from said opposite office or when a two-way line is released by said opposite office.

26. A switching system as claimed in claim 24 wherein said incoming connection process controlling means comprises:

activation signal accepting means for receiving information of a two-way line being activated by said opposite office and for informing said information to said two-way line managing means;

incoming connection releasing means for informing said two-way line managing means of release of said incoming connection when said incoming connection is released; and incoming connection responding means for requesting said trunk controlling means to transmit a response signal to said opposite office when a response is to be transmitted from said primary office to said opposite office.

27. A switching system as claimed in claim 24 wherein said two-way line managing means comprises:

trunk selecting means for selecting a trunk in response to a request to use a trunk from said outgoing connection control means in accordance with said priority for selecting of said two-way lines;

outgoing connection trunk releasing means for increasing the priority for the next selection of the trunk and for releasing said trunk being used when said primary office initiates release of a two-way lines;

incoming connection trunk releasing means for lowering the priority for the next selection of trunk and for releasing said trunk being used when said opposite office initiates release of a two-way line; and activation notifying signal receiving means for receiving a notification of an activation of a two-way line from said opposite office through said trunk controlling means and said incoming connection process controlling means to said two-way line managing means to put a trunk required by said opposite office into a busy state.

28. A switching system as claimed in claim 24 wherein said activation signal transmission requesting means in said outgoing connection process controlling means comprises:

activation processing means for providing said trunk controlling means with an activation signal transmitting request when one of said two-way lines is to be used;

two-way line requesting means for requesting a two-way line to be used to said trunk controlling means;

two-way line receiving means for receiving a two-way line to be used from said trunk controlling means; and activation signal transmit requesting means for requesting said trunk controlling means to transmit an activation signal to activate a two-way line to be used.

29. A switching system as claimed in claim 24 wherein said outgoing connection releasing means in said outgoing connection process controlling means further comprises release of outgoing connection informing means for informing the end of said outgoing connection release process to said two-way line managing means.

30. A switching system as claimed in claim 24 wherein said trunk notice receiving means in said outgoing connection process controlling means further comprises:

outgoing connection releasing means for releasing the outgoing connection in response to a request from said primary office;

release signal transmit requesting means for requesting a release signal to release the outgoing connection; and release of outgoing connection informing means for informing the end of said outgoing connection release process to said two-way line managing means.

* * * * *

UNITED STATES PATENT AND TRADEMARK OFFICE
CERTIFICATE OF CORRECTION

PATENT NO. : 5,046,181
DATED : September 3, 1991
INVENTOR(S) : Higuchi et al.

It is certified that error appears in the above-identified patent and that said Letters Patent is hereby corrected as shown below:

Title page, under Abstract, line 5, change "lkines" to --lines--;

Column 2, line 36, change "hunte"

to --hunt--;

Column 3, line 66, change "two way"

to --two-way--;

Column 4, line 2, change "two way"

to --two-way--;

UNITED STATES PATENT AND TRADEMARK OFFICE
CERTIFICATE OF CORRECTION

PATENT NO. : 5,046,181
DATED : September 3, 1991
INVENTOR(S) : Higuchi et al.

It is certified that error appears in the above-identified patent and that said Letters Patent is hereby corrected as shown below:

Column 4, line 15, change "hunte"

to --hunt--;

Column 4, line 38, change "above mentioned"

to --above-mentioned--;

Column 5, line 3, change "hunte"

to --hunt--;

Column 9, line 10, change "two way"

to --two-way--;

UNITED STATES PATENT AND TRADEMARK OFFICE
CERTIFICATE OF CORRECTION

PATENT NO. : 5,046,181

DATED : September 3, 1991

INVENTOR(S) : Higuchi et al.

It is certified that error appears in the above-identified patent and that said Letters Patent is hereby corrected as shown below:

Column 9, line 11, after "63" insert --,--;

Column 9, line 26, after "63" insert --,--;

Column 15, line 36, change "form" to --from--.

Signed and Sealed this

Sixth Day of April, 1993

*Attest:*

STEPHEN G. KUNIN

*Attesting Officer*     *Acting Commissioner of Patents and Trademarks*